(12) United States Patent
Thomas et al.

(10) Patent No.: US 8,758,697 B2
(45) Date of Patent: Jun. 24, 2014

(54) DEVICE AND METHOD FOR MICROSTRUCTURED PLASMA TREATMENT

(75) Inventors: Michael Thomas, Lehrte (DE); Claus-Peter Klages, Braunschweig (DE); Antje Zanker, Braunschweig (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 617 days.

(21) Appl. No.: 12/996,824

(22) PCT Filed: Jun. 9, 2009

(86) PCT No.: PCT/EP2009/004143
§ 371 (c)(1),
(2), (4) Date: Jun. 3, 2011

(87) PCT Pub. No.: WO2009/149899
PCT Pub. Date: Dec. 17, 2009

(65) Prior Publication Data
US 2011/0259730 A1 Oct. 27, 2011

(30) Foreign Application Priority Data
Jun. 9, 2008 (DE) .......................... 10 2008 027 461

(51) Int. Cl.
*B01J 19/08* (2006.01)
(52) U.S. Cl.
USPC ...................................... 422/186.05; 204/164
(58) Field of Classification Search
USPC ...................................... 422/186.05; 204/164
See application file for complete search history.

(56) References Cited

U.S. PATENT DOCUMENTS

| 3,348,022 A | 10/1967 | Schirmer |
| 3,407,131 A | 10/1968 | Hailstone |
| 4,024,038 A | 5/1977 | Luc |

(Continued)

FOREIGN PATENT DOCUMENTS

| DE | 60105979 T2 | 10/2005 |
| EP | 1255690 B1 | 9/2004 |
| JP | 09202496 A | 8/1997 |

OTHER PUBLICATIONS

Penanche, et al. "Plasma printing: patterned surface functionalisation and coating at atmospheric pressure", IEE Proc.-Nanobiotechnol., vol. 151, No. 4, Aug. 2004, pp. 139-144.

(Continued)

*Primary Examiner* — Kishor Mayekar
(74) *Attorney, Agent, or Firm* — Young Basile

(57) ABSTRACT

The invention relates to a device for the microstructured plasma treatment of a film substrate, especially of a plastic film. Said device comprises a rotatably received cylindrical electrode the surface of which contains or consists of metal, especially chromium, the surface having microstructured depressions, a planar high-voltage electrode the surface of which has a shape complementary to that of the cylindrical electrode and can be arranged on a section of the surface of the cylindrical electrode in a substantially form-fit manner, a transport device for transporting the film substrate to be treated between the surface of the cylindrical electrode and the high-voltage electrode, and a device for feeding a process gas to the surface of the cylindrical electrode and to the interspace between the cylindrical electrode and the high-voltage electrode.

11 Claims, 3 Drawing Sheets

(56) References Cited

U.S. PATENT DOCUMENTS

| | | | |
|---|---|---|---|
| 4,365,283 A | 12/1982 | Radice | |
| 6,103,033 A * | 8/2000 | Say et al. | 156/73.1 |
| 6,320,157 B1 | 11/2001 | Bloss et al. | |
| 7,647,887 B2 * | 1/2010 | Maeda et al. | 118/723 E |
| 2004/0187783 A1 | 9/2004 | Maeda et al. | |

OTHER PUBLICATIONS

English translation of Form PCT/IPEA/409—International Preliminary Report on Patentability—from the corresponding International Patent Application No. PCT/EP2009/004143 filed Jun. 9, 2009.

* cited by examiner

DEVICE AND METHOD FOR MICROSTRUCTURED PLASMA TREATMENT

TECHNICAL FIELD

The present invention relates in general to a device and a method for the microstructured plasma treatment of a foil substrate and also uses of such devices and methods. These are used in particular for the treatment of plastic foils, for example for coating plastic foils, or for activation or functionalisation of at least one of their surfaces.

BACKGROUND

For the microstructured functionalisation or coating of surfaces of foil substrates, conventionally the substrate is placed between two planar electrodes and the system is closed like a die over the foil via a stroke mechanism. One of the electrodes thereby has microstructures in which a plasma is then formed selectively during application of a high voltage. After the treatment, the system is opened again and the foil is guided a little further and subsequently a further part of the foil is treated in a corresponding manner. The method is therefore implemented in a batch process (batch treatment).

It is known for continuous treatment of a surface of a foil that a roller with a coarse structure opposite which an electrode is disposed can be used. A roller with different structural depths is provided here. The structures are then filled with a dielectric. On the side orientated away from the roller, a selective plasma can then be ignited. Hence a selective treatment of that foil side which is orientated away from the roller is possible. However, the roller structure requires a high aspect ratio of up to several millimeters so that, precisely in the case of process gases, such as nitrogen and noble gases, sharp delimitations of the structures can no longer be achieved. This resides mainly in the fact that a spatial glow discharge (also known as atmospheric plasma glow discharge) in the noble gases results. In the case of nitrogen as process gas, very long-lived reactive species which can also functionalise or treat those regions of the surface which are not subjected directly to the plasma are produced. A further disadvantage of these methods is that an undesired rear-side treatment of the foil can result.

SUMMARY

It is therefore the object of the present invention to make available a device and a method for the microstructured plasma treatment of a foil substrate, which can be conducted in the continuous process and enables the production and/or treatment of ultrasmall structures. Furthermore, it is an object of the present invention to make available uses of such devices and methods.

This object is achieved by the device disclosed herein, the method disclosed herein and also the use disclosed herein. Advantageous developments of the method according to the invention, of the device according to the invention and of the use according to the invention are also provided.

According to the invention, the foil to be treated is guided with the side to be treated over a roller or a cylinder which is configured as an electrode. This means that it has advantageously a metallic surface, in particular comprising chromium. This roller or this cylinder can be microstructured by means of lithography or engraving technology, such as for example deep engraving, laser exposure or laser ablation. The structures advantageously have structure widths in the range of 1 µm up to several 10 s of millimeters, advantageously between 20 µm and 5 mm. The depth of the structure is thereby advantageously a few micrometers up to several millimeters, advantageously 1 µm to 1 mm, advantageously 20 µm and 200 µm, and can be adjusted variably. The width of the roller is advantageously in the range of 0.1 to 5 m, it advantageously has a diameter of 10 to 60 cm, which shows the possibilities for scaling up the method.

As already mentioned, the foil to be treated is stretched with its surface to be treated opposite the cylinder surface over a partial region of this cylinder. Directly before applying the foil onto the cylinder surface, a process gas, in particular nitrogen, helium, forming gas etc., is introduced via a gas gap and is enclosed by applying the foil in the microstructured recesses.

Onto this foil to be treated, a high-voltage electrode is applied, the shape of which corresponds to the shape of that region of the cylinder on which the foil is situated. As a result, the high-voltage electrode is pressed closely onto the foil rear-side extensively in a form fit with the cylinder. As a result, there remain as cavities which contain process gas merely the microstructures in the cylindrical electrode. If now a high voltage is applied to the high-voltage electrode, then selective ignition of the plasma is effected in the microstructured recesses on the cylinder. The foil is thus treated ("structured") selectively in the regions in which the cylinder has microstructures or recesses.

It is possible in this way to treat the foil by structuring by applying a high voltage. Since the foil is guided over the roller, a continuous treatment of the surface of the foil orientated towards the roller is possible. It is therefore also possible to treat the foils continuously from roller to roller. In this way, a treatment of the surface of the foil is therefore possible, for example improving the wetting of the foil or even a metallisation, selectively in individual regions. Thus for example flexible strip conductors, RFID switching circuits, biosensors and/or smart tags can be applied on the foil in a resource-saving and extremely economical manner.

Advantageously, a further foil is guided parallel to the foil substrate between the high-voltage electrode and the foil substrate in order to prevent damage to the foil substrate on its rear-side orientated towards the high-voltage electrode. The further foil can thereby be guided rotationally.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
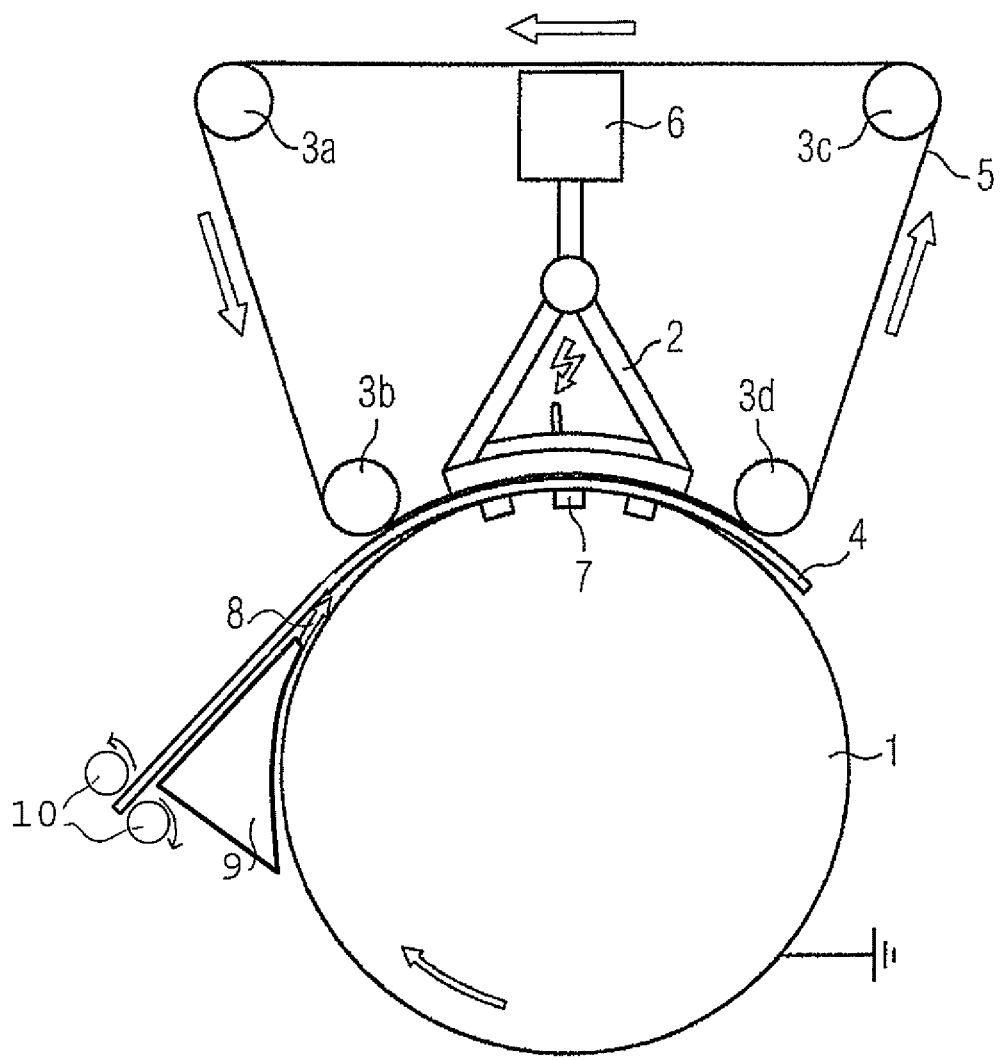
FIG. 1 illustrates the construction of a device for the microstructured continuous treatment of foil substrates.

FIG. 1 shows a device for the microstructured continuous treatment of foils. This has a cylindrical electrode 1 which is connected electrically to earth. It has a surface made of chromium. The surface of the cylinder 1 has microstructured recesses 7 which are represented merely schematically in FIG. 1 and superelevated with respect to their size. A foil 4, the surface of which orientated towards the cylinder 1 is intended to be treated is guided on this surface of the cylinder 1. This foil is guided for example via a transport device 10, such as rollers, to the cylinder 1 and guided away again from the cylinder. A continuous treatment of the foil surface thus takes place. Immediately before applying the foil 4 to the surface of the cylinder 1, a process gas 8 is supplied from device 9 and is enclosed subsequently in the microstructured recesses 7 between the cylinder surface and the foil 4.

Above the cylinder 1, a high-voltage electrode 2 is situated, which can be pressed securely onto the surface of the cylinder 1 via a device 6. The surface of the electrode 2 situated opposite the surface of the cylinder 1 has a shape which is complementary to the surface of the cylinder 1 and can therefore be pressed onto the surface of the cylinder 1 or onto the foil 4 extensively in a form fit.

In addition, a further foil 5 is guided rotationally via a device for rotational transport illustrated as rollers 3a, 3b, 3c, 3d between the foil 4 and the high-voltage electrode 2, the foil 5 essentially protecting the foil 4 from damage by the high-voltage electrode 2 when passing through the gap between the roller 1 and the high-voltage electrode 2. If the foil 5 is guided through the gap at the same speed as the foil 4, the foil 5 protects the foil 4 from displacements and scratches on the rear-side surface of the foil 4 orientated towards the high-voltage electrode 2.

Figure 2:
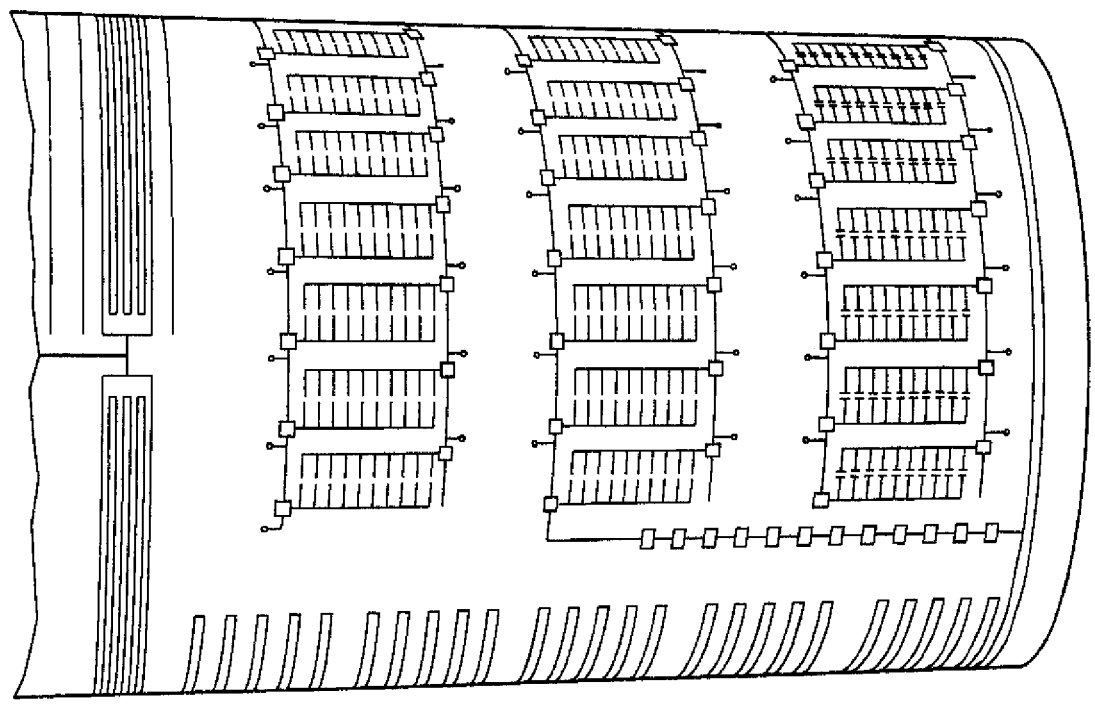
FIG. 2 illustrates a roller structured with deep engraving.

FIG. 2 now shows a roller structured with deep engraving, as was used in the following example.

In this example, a foil is pretreated for better wetting.

Figure 3:
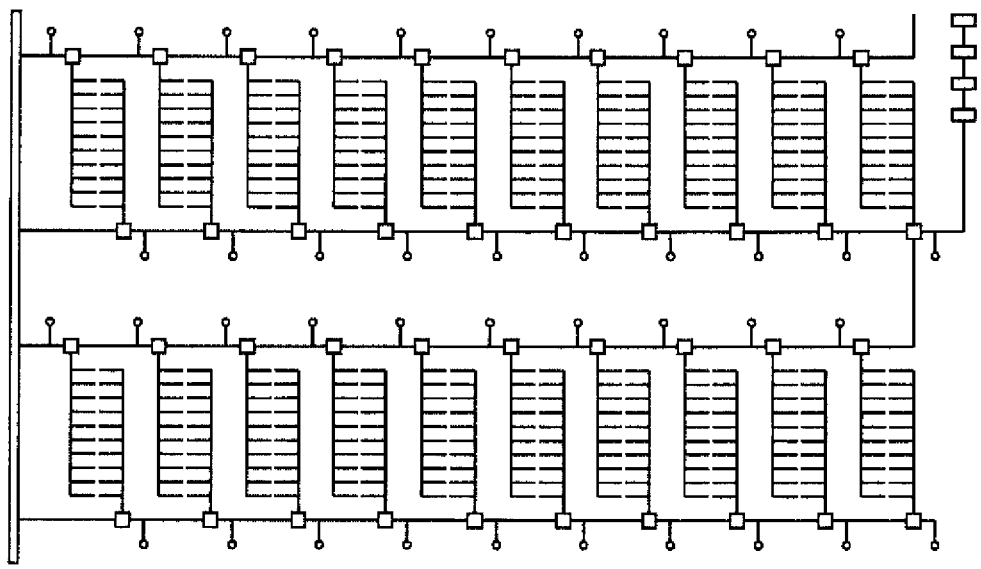
FIG. 3 illustrates a PET foil treated by structuring after wetting with water vapour.

The structured pretreatment for the wetting was implemented by way of example on a PET foil. Tests were effected with a total gas flow 70 slm $N_2$, at a power of 140 W and a frequency of 20 kHz. The belt speed of the foil thereby was 0.6 m/min. In subsequent wetting tests via warm water vapour, the different untreated (hydrophobically) and treated (hydrophilically) regions emerged clearly, as can be detected in FIG. 3.

In a further example, a pretreatment according to the invention for wet-chemical metallisation was implemented.

For the structured pretreatment, a polyimide foil with a gas mixture comprising 85% He, 13.5% $N_2$ and 1.5% $H_2$ was functionalised in plasma, by way of example. The total gas flow was in the range between 50 and 70 slm, the power was 84 W at a frequency of 22 kHz. The belt speed of the foil was 0.6 m/min. However also the treatment with a gas mixture comprising 97.9% $N_2$ and 2.1% $H_2$ (49 $N_2$ and 21 $N_2/H_2$) at 70 slm total gas flow with similar ignition parameters led to a successful structured functionalisation. The belt speed here was also 0.6 m/min. The foils were then subsequently metallised wet-chemically according to the following procedure, as described for example in Charbonnier:

1) Nucleation with PdCl2,
2) Reduction with sodium hypophosphite,
3) Chemical copper-plating.

Figure 4:
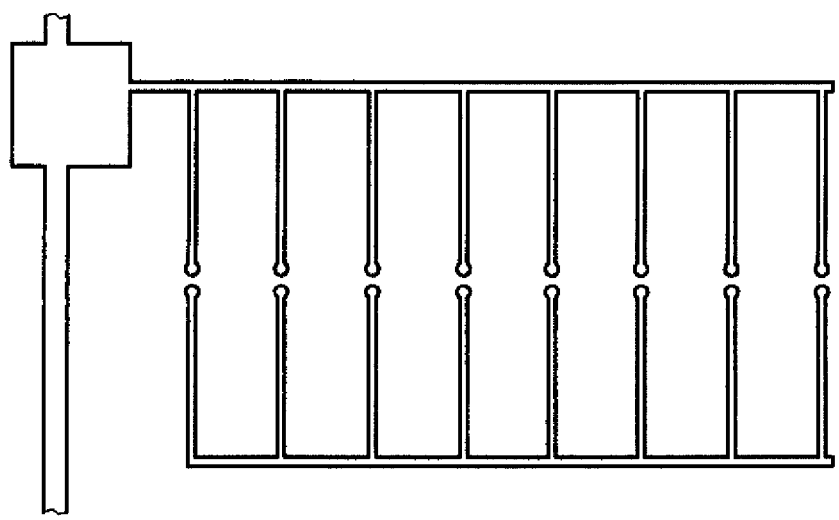
FIG. 4 illustrates a polyimide foil metallised wet-chemically with structure widths in the range of 200 µm after structured wet-chemical treatment.

FIG. 4 shows here a metallised polyimide foil treated according to the invention with structure widths in the range of 200 μm.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. Device for the microstructured plasma treatment of a foil substrate comprising:
    a rotatably mounted cylindrical electrode having a surface of which comprises metal, wherein the metal is chromium, the surface having microstructured recesses;
    a planar high-voltage electrode having a surface of which has a shape complementary to the surface of the rotatably mounted cylindrical electrode and disposed on a portion of the surface of the rotatably mounted cylindrical electrode extensively in a form fit;
    a transport device for transporting the foil substrate to be treated between the surface of the rotatably mounted cylindrical electrode and the planar high-voltage electrode; and
    a device for supplying process gas to the surface of the rotatably mounted cylindrical electrode and into an intermediate space between the rotatably mounted cylindrical electrode and the planar high-voltage electrode.

2. Device according to claim 1 further comprising:
    a device for rotational transport of a further foil positioned between a surface of the foil substrate to be treated and one of the rotatably mounted cylindrical electrode and the planar high-voltage electrode.

3. Device according to claim 2, wherein the transport device for transporting the foil substrate to be treated and the device for rotational transport of the further foil are configured such that the foil substrate to be treated and the further foil are moved at an equal speed over the surface of the rotatably mounted cylindrical electrode.

4. Device according to claim 1, wherein the rotatably mounted cylindrical electrode has at least one of:
    a width between 10 cm and 5 m, a diameter between 10 cm and 60 cm, microstructured recesses with a depth between 1 μm and 1 mm, and microstructured recesses with a structure width per recess between 1 μm and 10 mm.

5. Method for the microstructured plasma treatment of a foil substrate comprising:
    transporting the foil substrate with a transport device between a surface of a rotatably mounted cylindrical electrode and a surface of a planar high-voltage electrode, wherein the surface of the rotatably mounted cylindrical electrode comprises chromium metal and has microstructured recesses and the surface of the planar high-voltage electrode has a shape complementary to the surface of the rotatably mounted cylindrical electrode and is disposed on a portion of the surface of the rotatably mounted cylindrical electrode extensively in a form fit;
    introducing a process gas between the surface of the rotatably mounted cylindrical electrode and a surface of the foil substrate with a gas supply device that supplies the process gas into an intermediate space between the rotatably mounted cylindrical electrode and the planar high-voltage electrode;
    applying the foil substrate onto the surface of the rotatably mounted cylindrical electrode immediately after introducing the process gas such that the process gas is enclosed in the microstructured recesses by the foil substrate; and
    applying a high voltage between the rotatably mounted cylindrical electrode and the planar high-voltage electrode such that a cold transient plasma gas discharge is produced in the enclosed process gas.

6. Method according to claim 5 further comprising:
transporting a further foil rotationally between the foil substrate and the planar high-voltage electrode.

7. Method according to claim 6, wherein the foil substrate to be treated and the further foil are transported through at an equal speed between the surfaces of the rotatably mounted cylindrical electrode and the planar high-voltage electrode.

8. Method according to claim 5, wherein the rotatably mounted cylindrical electrode has at least one of:
a width between 10 cm and 5 m, a diameter between 10 cm and 60 cm, microstructured recesses with a depth between 1 µm and 1 mm, and microstructured recesses with a structure width per recess between 1 µm and 10 mm.

9. Method according to claim 8, wherein the microstructured recesses have the structure width per recess between 20 µm and 5 mm.

10. Method according to claim 5, wherein the process gas in the microstructured recesses has a pressure between 0.1 bar and 10 bar.

11. Method according to claim 10, wherein the process gas in the microstructured recesses has a pressure between 0.5 bar and 1.5 bar.

\* \* \* \* \*